United States Patent [19]

Cadek

[11] Patent Number: 4,578,794
[45] Date of Patent: Mar. 25, 1986

[54] METALLURGICAL VESSEL

[75] Inventor: Walter Cadek, Graz, Austria

[73] Assignee: Vereinigte Edestahlwerke Aktiengesellschaft (VEW), Vienna, Austria

[21] Appl. No.: 610,120

[22] Filed: May 14, 1984

[30] Foreign Application Priority Data

Jun. 1, 1983 [AT] Austria .................................. 2004/83

[51] Int. Cl.⁴ ........................ H05B 3/60; F27D 3/00; F27D 9/00
[52] U.S. Cl. ........................................ 373/42; 373/45; 373/67; 373/107; 373/116; 164/515
[58] Field of Search ................... 373/67, 146, 45, 107, 373/42, 49, 102, 116; 164/509, 513, 514, 515

[56] References Cited

U.S. PATENT DOCUMENTS

| 2,951,890 | 9/1960 | Yeomans et al. | 373/107 |
| 2,978,525 | 4/1961 | Gruber et al. | 373/107 |
| 3,669,178 | 6/1972 | Theisen | 164/509 |
| 3,729,307 | 4/1973 | Plessing | 373/45 |
| 4,238,637 | 12/1980 | Bingen et al. | 373/146 |

FOREIGN PATENT DOCUMENTS 457861  1/1975  U.S.S.R. ............... 373/107

*Primary Examiner*—Roy N. Envall, Jr.
*Attorney, Agent, or Firm*—Werner W. Kleeman

[57] ABSTRACT

The metallurgical vessel comprises a continuous wall and a bottom plate and such vessel constitutes a mold for electrically remelting an electrode by resistance heating of an electrically conductive slag bath. The metallurgical vessel further comprises solenoids for generating an electromagnetic field which is controlled by control means operatively connected to a reference signal generator and to magnetic measuring means like Hall generators preferably arranged tangentially relative to the vessel.

34 Claims, 6 Drawing Figures

METALLURGICAL VESSEL

BACKGROUND OF THE INVENTION

The present invention relates to a new and improved metallurgical vessel for high-melting alloys, especially alloys formed on the basis of nickel, steel or the like.

In its more particular aspects, the present invention relates to a new and improved metallurgical vessel for high-melting alloys, especially alloys formed on the basis of nickel, steel or the like, in which molten metal is caused to solidify under the action of electric direct-current or electric alternating-current.

To obtain a grain structure which is as homogeneous as possible during ingot and strand casting it is already known to permit the molten metal to solidify under the action of the electromagnetic fields of a number of solenoids. Such solenoids are interdependently supplied with electric direct-current or alternating-current so that, for example, travelling fields or the like are generated whereby the melt is made to move relative to the mold. The solenoids may be arranged such as to rotate the melt about the longitudinal axis of the mold or such that the melt flows in axial direction and returns again in the opposite direction.

It is also known to arrange stirring coils in metallurgical furnaces which are operated by alternating-current or direct-current. The electromagnetic field generated by such stirring coils is superimposed on the electromagnetic field caused by the current for the melting operation.

As already stated, the current producing the melting work builds up an electromagnetic field which also may affect the solidification of the melt. If an asymmetric electromagnetic field is built up relative to the mold, then the solidifying melt is differently displaced, and thus, also differently cooled depending in which region the melt is located. It should be considered that in a mold, particularly when heat is generated and a metal melt is possibly additionally charged, at least heat-caused flows or streams occur during the solidification of the melt and these flows or streams of the melt are then deflected by an asymmetric magnetic field. Such asymmetric magnetic fields, for example, can occur during electroslag remelting. It is not required for such operation that the entire electrode block has to be re-molten, but there can also be initially introduced a melt into the mold and only the so-called crop-heating-process can then be carried out using an electrode. The aforementioned asymmetric magnetic fields can also occur in an electric arc-furnace and the like.

SUMMARY OF THE INVENTION

Therefore, with the foregoing in mind, it is a primary object of the present invention to provide an improved construction of a metallurgical vessel for high-melting alloys, especially alloys formed on the basis of nickel, steel or the like, which is not afflicted with the aforementioned drawbacks and limitations of the prior art constructions.

Another and more specific object of the present invention aims at the provision of a new and improved construction of a metallurgical vessel for high-melting alloys, especially alloys formed on the basis of nickel, steel or the like, which permits building up a predetermined and desired electromagnetic field around such vessel.

Heretofore it has only been tried to obtain a particularly symmetrically aligned electromagnetic field by a distinct arrangement of the supply conductors for the melting current. Generally, however, such efforts are deemed to failure when the current is not exactly coaxially returned through a tubular conductor but through one or a number of conductors which are not sufficiently widely spaced from the melt (pseudocoaxial current return. Significant magnetic cross-fields can occur in the melt, particularly due to return conductors which are closely arranged to the melt. Even in the case of exactly coaxial and tubular return conducts there can occur, due to aging or contamination of the contact locations which are present in most cases, different transfer resistances and thus a decrease in or loss of the coaxial current conduction. Magnetic cross-fields originating from adjacent furnaces or installations or generated by ferromagnetic materials present in the proximity of the metallurgical vessel pose a further problem in conventional installations.

Now in order to implement the aforementioned and still further objects of the invention, which will become more readily apparent as the description proceeds, the vessel of the present development is manifested by the features that, a plurality of solenoids, which are electrically powered independently of each other, are arranged about the metallurgical vessel. The electrical power supply thereof is controlled via magnetic measuring sensors which are arranged around the metallurgical vessel. Preferably such measuring sensors are arranged tangentially relative to the lines of magnetic force of the electromagnetic field which is generated by the electric direct-current or alternating-current or by the direct-current and the alternating-current. Particularly the magnetic measuring sensors can be substantially tangentially arranged with respect to the metallurgical vessel.

Using such a device or arrangement any desired electromagnetic field can be set up. Simultaneously there exists the possibility of completely compensating for the magnetic fields which, for example, extend in a transverse direction relative to the lengthwise axis of the metallurgical vessel. The magnetic measuring sensors measure the magnetic field existing at their relative location and when, for example, complete compensation is desired, the solenoids are powered via a corresponding compensation circuit such that an oppositely directed magnetic field is generated. Due to the plurality of solenoids there can be obtained a particularly fine compensation since the intensity of the compensating magnetic fields can be maintained smaller. This is of particular advantage because the intensity decreases proportional to the square of the distance from the solenoids.

According to a further feature of the metallurgical vessel according to the invention the solenoids are arranged at least at the level of the region of the metallurgical vessel which is contacted or washed by the melt. A specifically simple device is thereby provided which permits obtaining the highest field strength just in that region where the compensation is preferred.

When the axes of the solenoids are arranged substantially normally relative to the electric flow direction of the electric direct-current or alternating-current or direct and alternate currents in the ingot, then an apparatus is obtained which is particularly well suited for the compensation of transverse fields.

When the measuring sensors and preferably the solenoids are provided at a support arranged around the mold and displaceable along the build-up or formation direction of the ingot, then the compensation can be continuously performed using a single compensating device.

A particularly robust arrangement is obtained when each magnetic measuring sensor is connected to individual control means for controlling at least one solenoid. Such an arrangement takes account of the specifically robust operating conditions in a steel installation and insures for trouble-free operation also for long periods of time.

A particularly space-saving arrangement is obtained when the magnetic measuring sensor, if desired, conjointly with the control means is arranged within the solenoid particularly on the axis thereof and preferably in the symmetry center thereof. Simultaneously a particularly useful measuring result can be obtained.

In the vessel according to the invention, a Hall generator can be used as the magnetic measuring sensor. By means of the Hall generator a particularly good compensation is achievable by means of a simple bridge circuit.

The measuring sensor and the control means may contain individual cooling means, particularly facilities for water cooling, whereby the temperature of such members constituting the measuring sensor and the control means can be particularly effectively controlled so that these members, if desired, can be arranged in close proximity to the metallurgical vessel. A specially good compensation of the electromagnetic fields can be achieved when the individual solenoids are annularly arranged about the vessel and overlap each other.

The magnetic field can be more precisely controlled the smaller the size of the solenoids. In such case it has been found that at least two rows or series of solenoids which are arranged beneath each other provide particular advantages.

A specifically interference-free arrangement of the measuring sensors is obtained when the solenoids are arranged beneath each other and the measuring sensors are located on a generatrix.

For the control of the magnetic field it is highly advantageous when the individual solenoids have a shape which partially corresponds to the outer shape of the metallurgical vessel, so that the solenoids form an envelope located at a substantially constant distance from the metallurgical vessel.

A further control of the magnetic field can be achieved by pivotably arranging the solenoids.

Generally, the magnetic field which is generated by the compensating current flowing through the solenoid is sufficiently homogeneous within the solenoid for the use described herein. In extreme cases, however, it is possible to generate a homogeneous compensating field by an appropriate distribution of the individual windings of the solenoid across the surface thereof. In particular, the compensating field in the region of the sensor can be increased or decreased by means of a small additional coil or solenoid which directly surrounds the magnetic sensor so that overall and on the average a precise compensation is obtained without the arrangement becoming unstable. By such measures, a compensation can be obtained on the average even in the case of an inhomogeneous compensating field.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
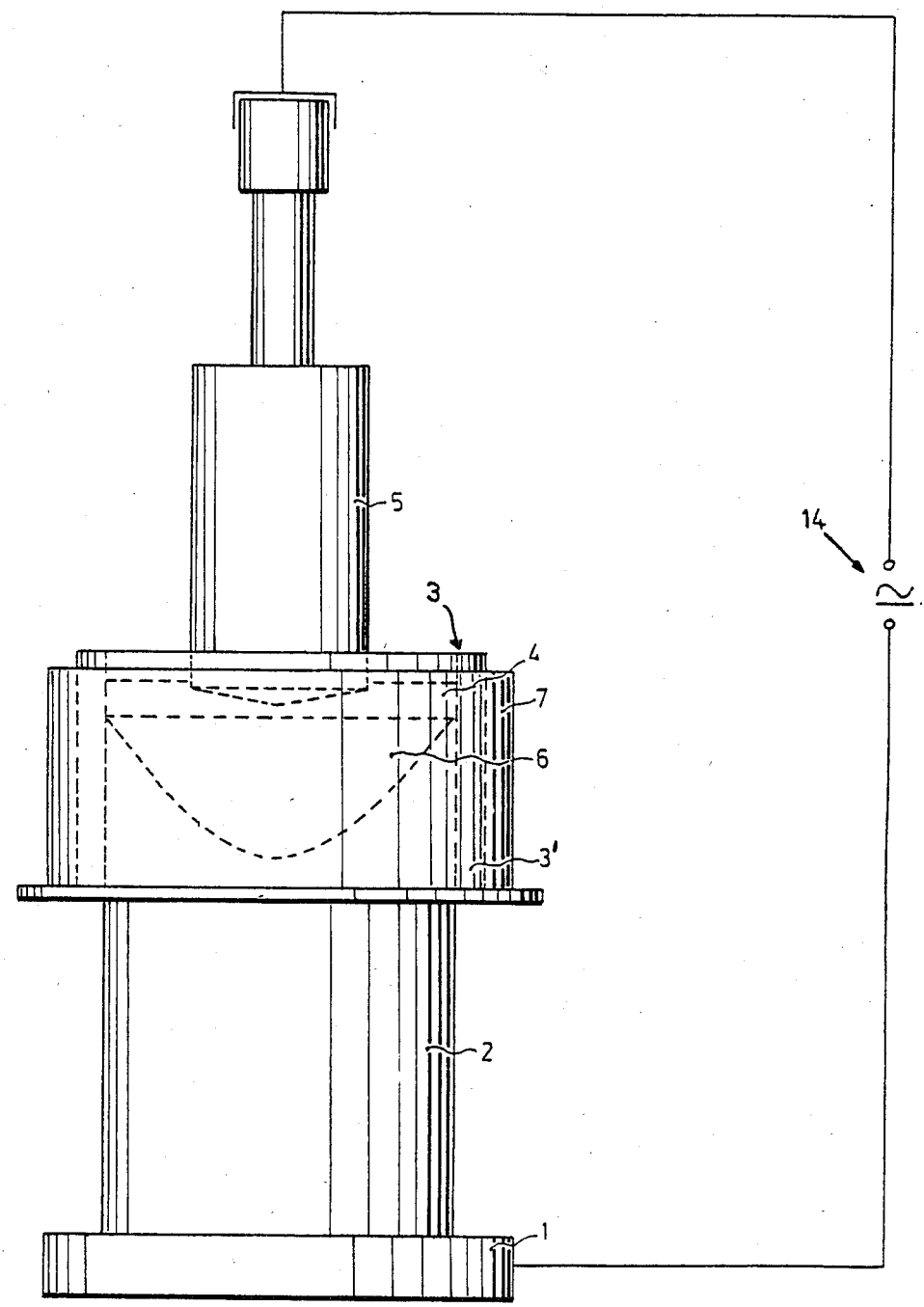
FIG. 1 is a schematic illustration of an electroslag remelting installation including a metallurgical vessel constructed according to the invention.

Describing now the drawings, it is to be understood that only enough of the construction of the metallurgical vessel and its related structure has been shown as needed to enable those skilled in the art to readily understand the underlying principles and concepts of the present development, while simplifying the showing of the drawings. Turning now specifically to FIG. 1, there has been schematically illustrated an electroslag remelting installation comprising a bottom plate 1 upon which there bears an already partially built-up ingot 2 which is formed by means of an elevationally displaceable water-cooled mold 3 having a continuous wall 3' which may be formed of a paramagnetic material or a diamagnetic material. A slag bath 4 is present within the mold 3 and the electrode 5 which is to be remolten extends into the slag bath 4. Molten metal 6 is present below the slag bath 4. On the outside the mold 3 contains a support or support member 7 which is arranged in the region of the solidifying melt and which supports a plurality of solenoids 10 and measuring sensors 11 associated therewith, as best seen by referring to FIG. 2. A suitable current source 14 is also provided.

Figure 2:
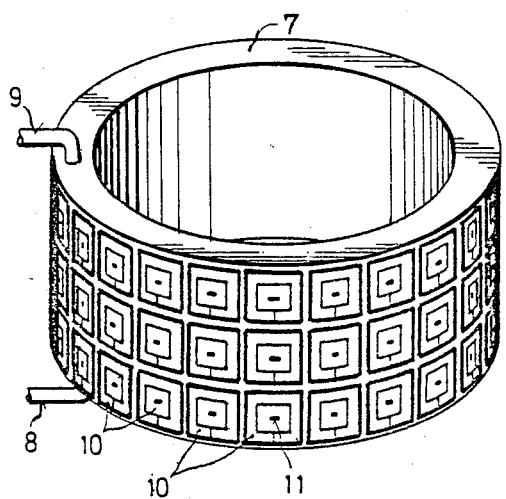
FIG. 2 is a perspective view of a water-cooled support in the installation as shown in FIG. 1.
Figure 3:
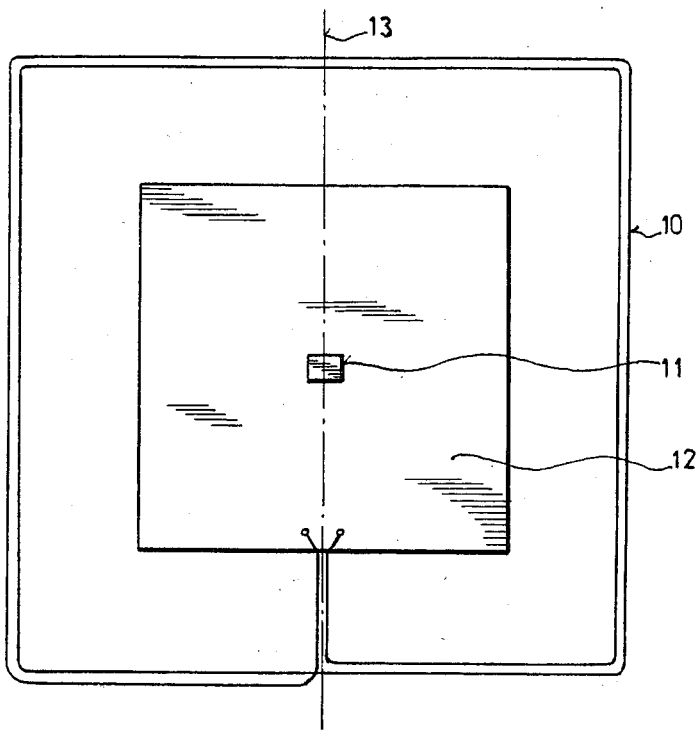
FIG. 3 is a schematic view of a solenoid placed on the support shown in FIG. 2 and including a measuring sensor.

The support 7 which is illustrated in detail in FIG. 2 comprises a double shell and infeed and outfeed connection elements or studs 9 and 8, respectively, for a cooling medium. The support 7 may be displaced in conjunction with the elevationally displaceable mold 3. The support 7 is provided with the plurality of solenoids 10 which may overlap each other and which are arranged in three rows or series one beneath the other. The solenoids 10 are shaped in accordance with the shape of the support 7 which, in turn, is adapted to the shape of the mold 3. The solenoids 10 may be positioned approximately tangentially relative to the mold 3. At the center of each of the solenoids 10 there is arranged a related measuring sensor 11. An additional coil or solenoid to affect the magnetic field to be compensated for can be placed around the measuring sensor 11. The measuring sensors 11 are arranged one beneath the other and are located on a generatrix. As will be evident particularly from FIG. 3, the measuring sensor 11 is mounted at a circuit board 12 which supports the electronic circuit. The solenoid 10 may be pivotable about an axis 13. As the measuring sensor 11 there can be provided a Hall generator, a magneto-resistor or any other suitable measuring sensor responding to the magnetic field strength.

Figure 4:
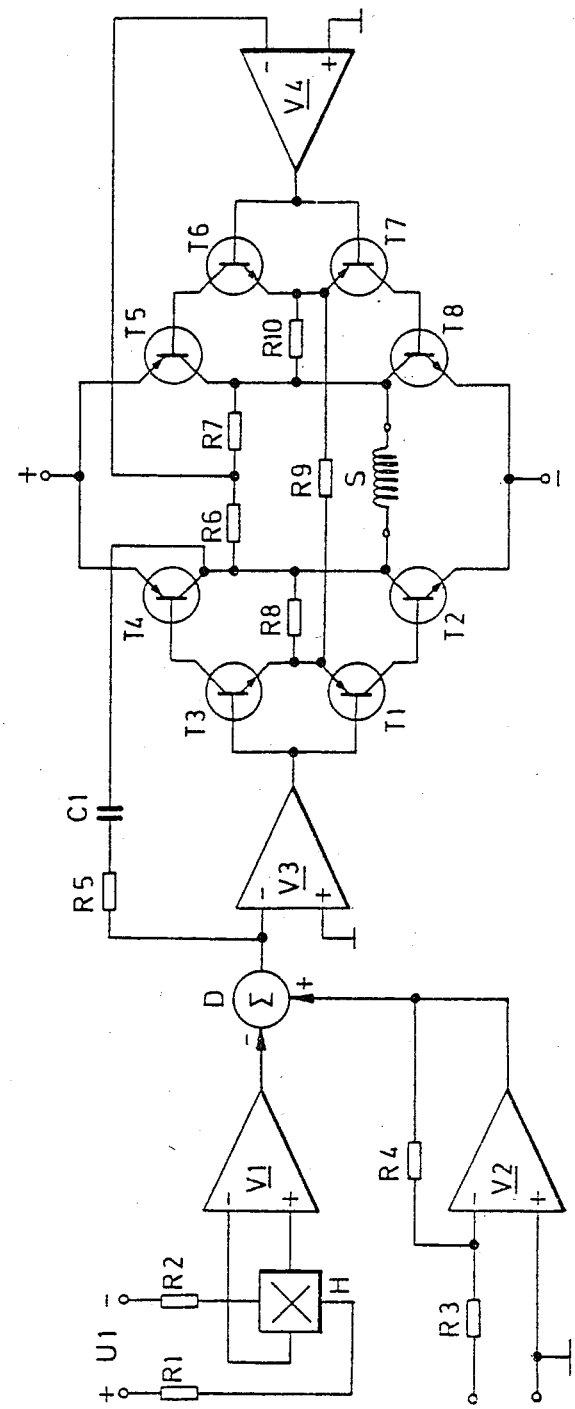
FIG. 4 is a schematic diagram of the electronic circuit in the control means for controlling the current supply to the solenoid shown in FIG. 3.

An exemplary embodiment of electronic circuit is illustrated in FIG. 4. The Hall generator H is supplied with a constant current a current source U1 via the resistors R1 and R2. When the Hall generator H is subjected to a magnetic field, a signal is generated thereby which is fed to and amplified by the amplifier V1. The amplified signal is compared to a predetermined reference value in a difference former D to which the reference value is fed via the amplifier V2 and the resistors R3 and R4. The output signal from the difference former D is amplified in an amplifier V3 and supplied to a first branch of a bridge circuit containing the transistors T1, T2, T3 and T4. The resistor R5 determines the proportional component and the capacitor C1 determines the integral component of the regulation properties. A second branch of the bridge containing the transistors T5, T6, T7 and T8 is controlled in opposite phase to the first branch of the bridge by means of the amplifier V4 and forms an electric power supply for the related solenoid S. The solenoid S is thereby supplied with a current which is determined by the comparison of the reference value with the signal coming from the Hall generator. The resistors R6 and R7 enable the bridge to be symmetrically operated while the resistors R8, R9 and R10 increase the output voltage range of the bridge circuit.

Figure 5:
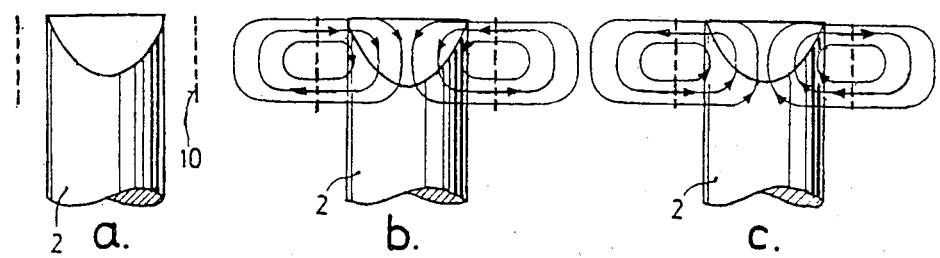
FIGS. 5a to 5f are graphic representations of different kinds of possible magnetic fields.
Figure 5:
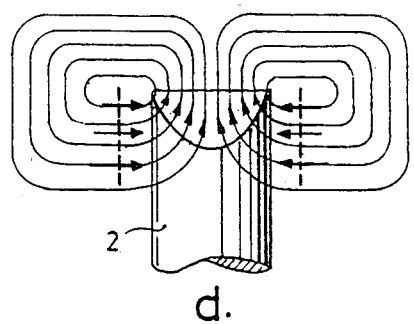

FIG. 5 schematically shows an ingot 2 which is surrounded by solenoids 10 which are only partially illustrated. The control of the magnetic field may be effected in entirely different manners. Thus, the control may be such that the ingot 2 is free of magnetic fields as shown in FIG. 5a. As shown in FIG. 5b, the control may be such that the magnetic field is downwardly directed along the ingot axis. The control may also be such that the magnetic field, as shown in FIG. 5c, is upwardly directed along the ingot axis. According to FIG. 5d the control is such that the magnetic field is concentrically upwardly directed. According to FIG. 5e the control is such that the magnetic field is directed towards the center, while according to FIG. 5f the control is such that the magnetic field is directed away from the center.

The solenoids including the control means may be arranged either directly at the mold 3 or, as described in the herein disclosed exemplary embodiment, at a support 7 or equivalent structure.

Figure 6:
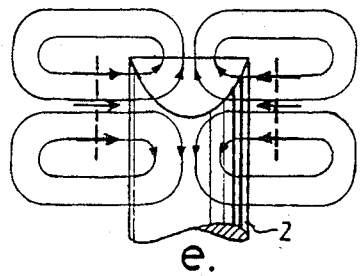
FIG. 6 is a graphic representation of the magnetic field generated by two symmetrical current return conductors in the installation shown in FIG. 1.
Figure 6:
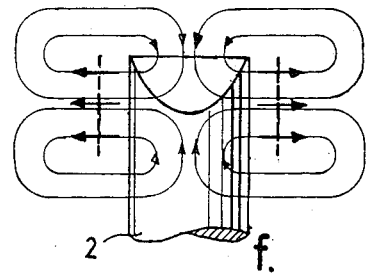
Figure 6:
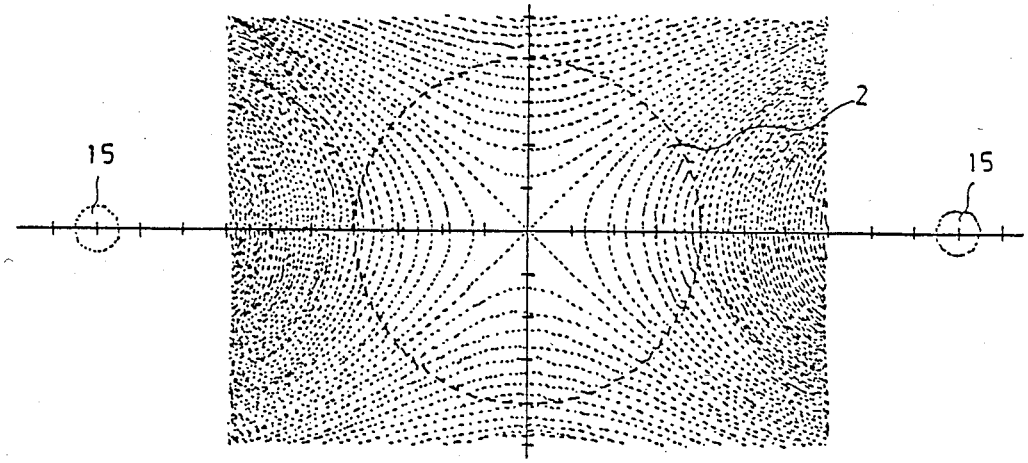

FIG. 6 illustrates the magnetic field which is generated by the current flowing in the two symmetrically arranged return conductors or lines 15. It is distinctly recognizable that the lines of force penetrate into the ingot 2 through the ingot surface. By means of the metallurgical vessel according to the invention, for example, the horizontal component of the magnetic field can be completely compensated for so that no undesired influences occur during the metallurgical operation.

While there are shown and described present preferred embodiments of the invention, it is to be distinctly understood that the invention is not limited thereto, but may be otherwise variously embodied and practiced within the scope of the following claims.

Accordingly, what I claim is:

1. A metallurgical vessel for high-melting alloys, expecially alloys formed on the basis of nickel, steel or the like, comprising:
   a continuous wall;
   a bottom plate cooperating with said continuous wall;
   means for supplying electric current to the vessel formed by said continuous wall and said bottom plate;
   said continuous wall and said bottom plate holding molten metal for at least partial solidification under the action of said electric current;
   a plurality of solenoids for generating a predetermined electromagnetic field to cause movement of the molten material during solidifcation thereof and to compensate for magnetic fields which extend transverse to the longitudinal axis of the metallurgical vessel and arranged about the vessel formed by said continuous wall and said bottom plate;
   an electric power supply operatively associated with said plurality of solenoids in order to supply electric power to each one thereof independently of the others;
   a plurality of magnetic measuring sensors arranged about the vessel formed by said continuous wall and said bottom plate; and
   said magnetic measuring sensors controlling said electric power supply in order to generate said predetermined electromagnetic field by means of said plurality of solenoids.

2. The metallurgical vessel as defined in claim 1, wherein:
   said continuous wall essentially consists of a paramagnetic material.

3. The metallurgical vessel as defined in claim 1, wherein:
   said continuous wall essentially consists of a diamagnetic material.

4. The metallurgical vessel as defined in claim 1, wherein:
   said continuous wall is water-cooled.

5. The metallurgical vessel as defined in claim 1, wherein:
   said means for supplying electric current serves to supply current to said bottom plate.

6. The metallurgical vessel as defined in claim 1, wherein:
   said means for supplying electric current serves to supply direct-current.

7. The metallurgical vessel as defined in claim 1, wherein:
   said means for supplying electric current serves to supply alternating-current.

8. The metallurgical vessel as defined in claim 1, wherein:
   said means for supplying electric current serves to supply both direct-current and alternating-current.

9. The metallurgical vessel as defined in claim 1, wherein:
   said continuous wall defines, a mold for electrically remelting an electrode;
   said mold additionally holding an electrically conductive slag bath; and
   said electrode being electrically remelted by resistance heating of said electrically conductive slag bath.

10. The metallurgical vessel as defined in claim 9, wherein:
said metal in said mold is remelted in order to form an ingot; and
said mold being elevationally displaceable in correspondence to the growth of said ingot.

11. The metallurgical vessel as defined in claim 6, wherein:
said direct-current supplied by said current supply means generates an electromagnetic field; and
said plurality of magnetic measuring sensors being arranged substantially tangentially relative to lines of force of said electromagnetic field.

12. The metallurgical vessel as defined in claim 7, wherein:
said alternating-current supplied by said current supply means generates an electromagnetic field; and
said plurality of magnetic measuring sensors being arranged substantially tangentially relative to lines of force of said electromagnetic field.

13. The metallurgical vessel as defined in claim 8, wherein:
said direct-current and said alternating-current supplied by said current supply means generate an electromagnetic field; and
said plurality of magnetic measuring sensors being arranged substantially tangentially relative to lines of force of said electromagnetic field.

14. The metallurgical vessel as defined in claim 1, wherein:
said plurality of magnetic measuring sensors is substantially tangentially arranged with respect to the metallurgical vessel comprising said continuous wall and said bottom plate.

15. The metallurgical vessel as defined in claim 1, wherein:
said continuous wall includes a region contacted by the solidifying melt of said molten metal held by the vessel formed by said continuous wall and said bottom plate; and
said plurality of solenoids being arranged at least at the level of said region.

16. The metallurgical vessel as defined in claim 6, wherein:
said at least partially solidified molten metal forms an ingot;
said direct-current defining a current flow direction in said ingot;
each one of said plurality of solenoids defining a related axis; and
each said axis being aligned substantially normally relative to said flow direction.

17. The metallurgical vessel as defined in claim 7, wherein:
said at least partially solidified molten metal forms an ingot;
said alternating-current defining a current flow direction in said ingot;
each one of said plurality of solenoids defining a related axis; and
each said axis being aligned substantially normally relative to said flow direction.

18. The metallurgical vessel as defined in claim 8, wherein:
said at least partially solidified molten metal forms an ingot;
said direct-current and said alternating-current defining a current flow direction in said ingot;
each one of said plurality of solenoids defining a related axis; and
each said axis being aligned substantially normally relative to said flow direction.

19. The metallurgical vessel as defined in claim 9, further including:
a support for said plurality of magnetic measuring sensors;
said at least partially solidified molten metal forming an ingot;
said ingot defining an ingot build-up direction; and
said support being arranged around said mold and being displaceable in said ingot build-up direction.

20. The metallurgical vessel as defined in claim 19, wherein:
said plurality of solenoids are additionally arranged at said support.

21. The metallurgical vessel as defined in claim 1, further including:
a plurality of control means; and
each one of said plurality of control means being operatively associated with a related one of said plurality of magnetic measuring sensors and at least one related solenoid of said plurality of solenoids in order to control said at least one related solenoid in response to the related one of said plurality of magnetic measuring sensors.

22. The metallurgical vessel as defined in claim 1, wherein:
each one of said plurality of magnetic measuring sensors is arranged in a related one of said plurality of solenoids.

23. The metallurgical vessel as defined in claim 22, wherein:
each one of said plurality of solenoids defines a related axis; and
each one of said plurality of magnetic measuring sensors being arranged on said axis of a related one of said plurality of solenoids.

24. The metallurgical vessel as defined in claim 22, wherein:
each one of said plurality of solenoids defines a related symmetry center; and
each one of said plurality of magnetic measuring sensors being arranged at said symmetry center of a related one of said plurality of solenoids.

25. The metallurgical vessel as defined in claim 21, wherein:
each one of said plurality of said magnetic measuring sensors and a related one of said plurality of control means being arranged in a related one of said plurality of solenoids.

26. The metallurgical vessel as defined in claim 1, wherein:
each one of said plurality of magnetic measuring sensors comprises a Hall generator.

27. The metallurgical vessel as defined in claim 21, further including:
individual cooling means for each one of said plurality of magnetic measuring sensors and a related one of said plurality of control means.

28. The metallurgical vessel as defined in claim 27, wherein:
said cooling means comprise water-cooling means.

29. The metallurgical vessel as defined in claim 1, wherein:

individual ones of said plurality of solenoids are annularly arranged about said vessel formed by said continuous wall and said bottom plate; and said individual solenoids being arranged in an overlapping relationship.

30. The metallurgical vessel as defined in claim 1, wherein:

said plurality of solenoids forms at least two rows of said solenoids; and said at least two rows being arranged one beneath the other.

31. The metallurgical vessel as defined in claim 1, wherein:

said plurality of solenoids are arranged one beneath the other; and said magnetic measuring sensors being arranged on a generatrix.

32. The metallurgical vessel as defined in claim 1, wherein:

the vessel formed by said continuous wall and said bottom plate defines an outer shape;

individual ones of said plurality of solenoids having a shape which at least partially corresponds to said outer shape of the vessel; and said plurality of solenoids defines an envelope located at a substantially constant space from the vessel.

33. The metallurgical vessel as defined in claim 1, wherein:

each solenoid of said plurality of solenoids is pivotably arranged.

34. The metallurgical vessel as defined in claim 1, further including:

a plurality of additional solenoids; and each one of said plurality of additional solenoids immediately surrounding a related one of said plurality of magnetic measuring sensors.

* * * * *